United States Patent
Durand et al.

(10) Patent No.: US 10,063,480 B2
(45) Date of Patent: Aug. 28, 2018

(54) METHOD FOR DYNAMICALLY CONTROLLING THROUGHPUT SET POINTS IN A NETWORK ON A CHIP, CORRESPONDING COMPUTER PROGRAM AND DATA PROCESSING DEVICE

(71) Applicant: Commissariat a L'Energie Atomique et aux Energies Alternatives, Paris (FR)

(72) Inventors: Yves Durand, Saint-Ismier (FR); Christian Bernard, Saint Etienne de Crossey (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 317 days.

(21) Appl. No.: 14/808,526

(22) Filed: Jul. 24, 2015

(65) Prior Publication Data
US 2016/0028633 A1   Jan. 28, 2016

(30) Foreign Application Priority Data
Jul. 25, 2014 (FR) ...................................... 14 57242

(51) Int. Cl.
*H04L 12/803* (2013.01)
*H04L 12/825* (2013.01)
(Continued)

(52) U.S. Cl.
CPC ........ *H04L 47/125* (2013.01); *H04L 43/0882* (2013.01); *H04L 43/0888* (2013.01); *H04L 47/263* (2013.01); *H04L 47/822* (2013.01)

(58) Field of Classification Search
CPC ... H04L 47/125; H04L 47/263; H04L 47/822; H04L 43/0882; H04L 43/0888
See application file for complete search history.

(56) References Cited

U.S. PATENT DOCUMENTS

2011/0026400 A1*   2/2011   Harrand ................. H04L 47/70
370/235

FOREIGN PATENT DOCUMENTS

WO   WO 01/28167 A1   4/2001

OTHER PUBLICATIONS

French Preliminary Search Report with written opinion dated Jun. 11, 2015 in French Application 14 57242 filed on Jul. 25, 2014 (with English Translation of Categories of Cited Documents).

(Continued)

*Primary Examiner* — Kent Krueger
(74) *Attorney, Agent, or Firm* — Oblon, McClelland, Maier & Neustadt, L.L.P.

(57) ABSTRACT

A method for dynamically controlling throughput set points from sources to targets in a network on a chip including a plurality of nodes and a plurality of links between these nodes for transmission of data packets, including for each link of the network solicited by the transmission of data packets, estimation of an available throughput margin that includes the estimation of a first margin calculated based on a maximum throughput capacity of the link; and for each emitting source of at least one data packet, the calculation and the application of an update of its throughput set point according to the estimated available throughput margins. Estimation of available throughput margin for each link includes estimation of a second margin calculated based on a maximum local absorption capacity of possible sporadic overflows of the throughput set points and its value is determined according to the first and second calculated margins.

10 Claims, 6 Drawing Sheets

(51) Int. Cl.
  *H04L 12/911*  (2013.01)
  *H04L 12/26*  (2006.01)

(56) References Cited

OTHER PUBLICATIONS

Jeffrey M. Jaffe, "Bottleneck Flow Control", IEEE Transactions on Communications, vol. COM-29, (7), 1981, 9 pages.
Steven H. Low, et al., "Optimization Flow Control, I: Basic Algorithm and Convergence", IEEE/ACM Transactions on Networking, vol. 7, (6), 1999, 16 pages.
Hui Zhang, "Service Disciplines for Guaranteed Performance Service in Packet-Switching Networks", Proceedings of the IEEE, vol. 83, (10), 1995, 23 pages.
Rene L. Cruz, "A Calculus for Network Delay, Part I: Network Elements in Isolation", IEEE Transactions on Information Theory, vol. 37, (1), 1991, 18 pages.
Frank Kelly, "Charging and rate control for elastic traffic", European Transactions on Telecommunications, vol. 8, 1997, 16 pages.

\* cited by examiner

METHOD FOR DYNAMICALLY CONTROLLING THROUGHPUT SET POINTS IN A NETWORK ON A CHIP, CORRESPONDING COMPUTER PROGRAM AND DATA PROCESSING DEVICE

The invention relates to a method for dynamically controlling throughput set points in a network on a chip. It also relates to a corresponding computer program and a data processing device.

BACKGROUND OF THE INVENTION

In an integrated system, the communication between the calculating units is accomplished by means of a network on a chip. The traffic in this network has to be controlled in a precise manner in order to prevent any congestion while still providing the best effectiveness possible in the transfer of data. Such a control can be accomplished at the source using a traffic limiter of which the function is to control the data injected into the network according to throughput set points assigned respectively to all of the emitting sources of this data.

The invention then relates more particularly to a method for dynamically controlling throughput set points of emitting sources of data packets to receiving targets of these data packets in a network on a chip comprising a plurality of nodes, within which the sources and the targets are found, and a plurality of links between these nodes for the transmission of data packets. In a given topological configuration and for a given activity of emission sources, each active source emits its data packets to a target according to a point-to-point transmission channel, defined by a set of nodes and links between these nodes, and according to a throughput set point defined for this source or, equivalently, for this transmission channel. All of these transmission channels define what is referred to as a routing configuration. As each link is susceptible to belong to several different transmission channels and itself having a maximum throughput that is proper to it, an optimization of the throughput set points in a given routing configuration is required in order to streamline the data traffic while still complying with the needs in flow of each one of the sources. This optimization is generally complex but is important because it is sought to use as best as possible the bandwidth that is globally available in the network on a chip.

In the more general field of packet data transmission networks, many studies have been conducted and different methods of optimization distributed between the nodes of a network have been proposed.

DESCRIPTION OF THE PRIOR ART

As such for example, in the article of Jaffe, entitled "Bottleneck flow control", published in IEEE Transactions on Communications, vol. COM-29, no. 7, Jul. 1981, an iterative method for controlling throughput at the source is proposed comprising a repetition of the following steps:
for each link of a network solicited by the transmission of data packets and according to throughput set points defined for each emitting source and each corresponding transmission channel, the estimation of an available throughput margin that includes the estimation of a margin calculated based on a maximum throughput capacity of the link, for each emitting source of at least one data packet, the calculation and the application of an update of its throughput set point according to the estimated available throughput margins.

More precisely, the margin calculated for each link takes into account the difference between the maximum throughput that this link can support and the sum of the throughput set points of the transmission channels that include this link.

Also more precisely the iteration of the two preceding steps is repeated as long as all of the emitting sources are not saturated, i.e. as long as there exists at least one source of which no link of the associated transmission channel is saturated according to a predetermined saturation criterion.

Other methods of optimization proceed with a different formalization, by non-linear global optimization using a solver, but remain distributed. Such methods are for example described in the article of Kelly, entitled "Charging and rate control for elastic traffic", published in European Transactions on Telecommunications, vol. 8 (1997), pages 33-37, or in the article of Low et al., entitled "Optimization flow control, I: basic algorithm and convergence", published in IEEE/ACM Transactions on Networking, 7(6), pages 861-874, December 1999.

All of these methods are directly transposable in the field of data transmissions in a network on a chip.

But as has moreover been shown in the article of Zhang, entitled "Service disciplines for guaranteed performance service in packet-switching networks", published in Proceedings of the IEEE, vol. 83, no. 10, October 1995, taking the throughput capacity of each link into account is not enough to guarantee an absence of congestion. There exists indeed a phenomenon of distortion of the form of the traffic caused by possible sporadic overflows of the throughput set points at the points of convergences between transmission channels. These sporadic overflows have in particular been identified and formalized in the article of Cruz, entitled "A calculus for network delay, Part I: network elements in isolation" published in IEEE Transactions on Information Theory, vol. 37, no. 1, January 1991, then in the aforementioned article of Zhang.

The solutions that then consist in possibly providing an additional constant margin in order to avoid these congestions are not however satisfactory because they are not optimal.

It may thus be desirable to provide a method for dynamically controlling throughput set points in a network on a chip that makes it possible to overcome at least part of the aforementioned problems and constraints.

SUMMARY OF THE INVENTION

A method is therefore proposed for dynamically controlling throughput set points of emitting sources of data packets to receiving targets of these data packets in a network on a chip comprising a plurality of nodes, within which the sources and the targets are found, and a plurality of links between these nodes for the transmission of data packets, comprising:
for each link of the network on a chip solicited by the transmission of data packets, the estimation of an available throughput margin that includes the estimation of a first margin calculated based on a maximum throughput capacity of the link,
for each emitting source of at least one data packet, the calculation and the application of an update of its throughput set point according to the estimated available throughput margins, wherein the estimation of the available throughput margin for each link further comprises:
  the estimation of a second margin calculated based on a maximum local absorption capacity, by a buffer memory, of possible sporadic overflows of the throughput set points,
  the determination of a value of the available throughput margin according to the first and second calculated margins.

Each link of the network on a chip can indeed be viewed as the association of a physical point-to-point connection, between two adjacent nodes in a certain direction, and at least one buffer memory. This buffer memory can be an output buffer memory of the outgoing node of the link or an input buffer memory in the incoming node of the link. Regardless of the model chosen, this buffer memory has a limited capacity for absorbing sporadic overflows of the throughput set points that can arise at the points of convergence of the transmission channels and it is judicious to take this into account.

As such according to the invention, this maximum local absorption capacity of the possible sporadic overflows of the throughput set points is taken into account on the routing between the links of the network on a chip in determining the margins to be distributed between emitting sources, in such a way that the controlling of the throughput set points can be done in a genuinely optimum manner.

Optionally, for a given routing configuration including a set of transmission channels of the data packets between the sources and the targets, the steps of estimating the available throughput margins and of calculating updates of the throughput set points are executed solely for unsaturated transmission channels, i.e. transmission channels that do not yet have any link without available throughput margin, and repeated until all of the transmission channels are saturated.

Also optionally:
  the estimation of the first margin noted as "$rc_{lnk}$" for each link noted as "lnk", calculated based on the maximum throughput capacity of the link noted as "$C_{lnk}$", is carried out on the basis of the following equation:

$$rc_{lnk} = C_{lnk} - \varepsilon - \sum_{ch \in CC_{lnk}} \rho_{ch},$$

wherein $\varepsilon$ is a residual margin constant below which it is considered that the available throughput margin is zero for this link, $CC_{lnk}$ is all of the transmission channels noted as "ch" which include the link lnk and $\rho_{ch}$ designates the throughput set point of the transmission channel ch, and
  the estimation of the second margin noted as "$rd_{lnk}$" for each link lnk, calculated based on the maximum local absorption capacity of the link noted as "$BF_{lnk}$", is carried out on the basis of the following equation:

$$rd_{lnk} = BF_{lnk} - \varepsilon - \sum_{ch \in CC_{lnk}} D_{ch,lnk} \cdot \rho_{ch},$$

wherein $D_{ch,lnk}$ designates a predetermined coefficient that is proper to each link of each transmission channel.

Also optionally, as the controlling of the throughput is carried out at the source via a sliding window according to an arbitration discipline of the "work conserving" type: the maximum local absorption capacity of each link lnk is defined by the following equation:

$$BF_{lnk} = QSIZE - \frac{(N_{lnk} - 1)}{N_{lnk}} \cdot DMAX \cdot Tw,$$

wherein QSIZE is the size of the buffer memory associated with the link lnk, $N_{lnk}$ is the number of transmission channels passing through the link lnk, DMAX is an injection maximum instant throughput constant and Tw is the length of the sliding window, and
  each coefficient $D_{ch,lnk}$ is defined by the following equation:

$$D_{ch,lnk} = \sum_{l \in RR_{ch,lnk}} d_{l,ch},$$

wherein $RR_{ch,lnk}$ is the set of the links passed through upstream of the link lnk in the transmission channel ch, with "l" designating one of these links, and $d_{l,ch}$ is a coefficient defined by $d_{l,ch} = (nd_l - 1) \cdot PSIZE$, wherein $nd_l$ is the number of contributing directions on the buffer memory associated with the link l and PSIZE is the maximum size of the data packets expressed in the same unit as QSIZE.

Also optionally, the steps of estimating the available throughput margins and of calculating updates of the throughput set points are executed sequentially, with this sequence itself being executed iteratively.

Also optionally, the steps of estimating available throughput margins and of calculating updates of the throughput set points are executed sequentially using synchronization barriers implemented in the form of message down-counters for each link of the network on a chip solicited by the transmission of data packets and for each emitting source of at least one data packet.

Also optionally, the steps of estimating the available throughput margins and of calculating updates of the throughput set points are executed incrementally and are interlaced by a serialization of dynamic control messages of the throughput set points according to predefined paths.

Also optionally, the value of the available throughput margin is determined for each link as a minimum between the first and second margins calculated for this link.

A computer program is also proposed that can be downloaded from a communication network and/or recorded on a support that can be read by computer and/or be executed by a processor, comprising instructions for the execution of the steps of a method for dynamically controlling throughput set points according to the invention, when said program is executed on a computer.

Finally, a network on a chip data processing device is also proposed, comprising:
  a plurality of nodes, within which are found emitting sources of data packets and receiving targets of these data packets,
  a plurality of links between these nodes for the transmission of data packets, and
  calculators for the dynamic control of throughput set points of the sources, distributed between the nodes of the network on a chip and programmed to:
    for each link of the network on a chip solicited by the transmission of data packets, estimate an available throughput margin by estimating a first margin calculated based on a maximum throughput capacity of the link, for each emitting source of data packets, calculate an update of its throughput set point according to the estimated available throughput margins, wherein each calculator programmed to estimate the available throughput margin of any one of the links is further programmed to:

estimate a second margin calculated based on a maximum local absorption capacity, by a buffer memory, of possible sporadic overflows of the throughput set points, determine a value of the available throughput margin according to the first and second calculated margins.

BRIEF DESCRIPTION OF THE DRAWINGS

The invention shall be better understood using the following description, provided solely as an example and in reference to the annexed drawings wherein.

DESCRIPTION OF THE PREFERRED EMBODIMENTS

Figure 1:
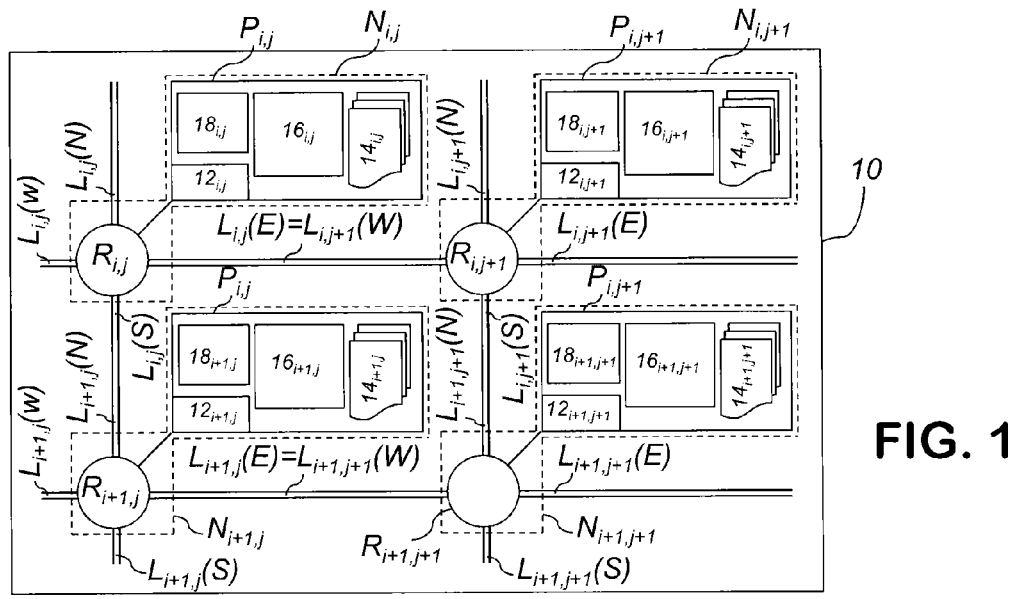
FIG. 1 diagrammatically shows the general structure of a network on a chip data processing device, according to an embodiment of the invention, FIG. 2 diagrammatically shows the general structure of an example of a router arranged on a network node of the data processing device of FIG. 1.

The data processing device 10 shown in FIG. 1 comprises a network on a chip partially shown. This network on a chip, carried out in the form of an integrated circuit, is constituted of a plurality of nodes arranged in an array and interconnected together by bidirectional links directed in the four array directions North (N), South (S), West (W) and East (E). The links allow for the transmission of data packets from one node to another.

In the example of FIG. 1, only four nodes are shown in a non-restricted manner and noted as $N_{i,j}$, $N_{i,j+1}$, $N_{i+1,j}$ and $N_{i+1,j+1}$. Four bidirectional links $L_{i,j}(N)$, $L_{i,j}(S)$, $L_{i,j}(W)$ and $L_{i,j}(E)$ depart from the node $N_{i,j}$ in the four aforementioned directions. Four bidirectional links $L_{i,j+1}(N)$, $L_{i,j+1}(S)$, $L_{i,j+1}(W)$ and $L_{i,j+1}(E)$ depart from the node $N_{i,j+1}$ in the four aforementioned directions. Four bidirectional links $L_{i+1,j}(N)$, $L_{i+1,j}(S)$, $L_{i+1,j}(W)$ and $L_{i+1,j}(E)$ depart from the node $N_{i+1,j}$ in the four aforementioned directions. Finally, four bidirectional links $L_{i+1,j+1}(N)$, $L_{i+1,j+1}(S)$, $L_{i+1,j+1}(W)$ and $L_{i+1,j+1}(E)$ depart from the node $N_{i+1,j+1}$ in the four aforementioned directions. Note that the bidirectional link $L_{i,j}(E)$ corresponds to the bidirectional link $L_{i,j+1}(W)$, that the bidirectional link $L_{i+1,j}(E)$ corresponds to the bidirectional link $L_{i+1,j+1}(W)$, that the bidirectional link $L_{i,j}(S)$ corresponds to the bidirectional link $L_{i+1,j}(N)$ and that the bidirectional link $L_{i,j+1}(S)$ corresponds to the bidirectional link $L_{i+1,j+1}(N)$.

The node $N_{i,j}$ comprises more precisely a processor $P_{i,j}$ and a router $R_{i,j}$. The function of the router $R_{i,j}$, is to direct each packet of data that it receives from the processor $P_{i,j}$ or from one of the four aforementioned directions to the processor $P_{i,j}$ or one of the four aforementioned directions, keeping in mind that the input must be different from the output in order for the data transfer to have a direction. In a well-known manner, the processor $P_{i,j}$ comprises a network interface $12_{i,j}$, able to communicate with the router $R_{i,j}$, processing elements $14_{i,j}$, able to carry out programmed data processing operations, and a local memory $16_{i,j}$, for example configured in cache memory with one or several levels. It further comprises a calculator $18_{i,j}$, for dynamically controlling throughput set points, for example functionally integrated into a communication control module.

Likewise, the node $N_{i,j+1}$ comprises a processor $P_{i,j+1}$ and a router $R_{i,j+1}$, with the processor $P_{i,j+1}$ comprising a network interface $12_{i,j+1}$, processing elements $14_{i,j+1}$, a local memory $16_{i,j+1}$ and a calculator $18_{i,j+1}$ for dynamically controlling throughput set points; the node $N_{i+1,j}$ comprises a processor $P_{i+1,j}$ and a router $R_{i+1,j}$, with the processor $P_{i+1,j}$ comprising a network interface $12_{i+1,j}$, processing elements $14_{i+1,j}$, a local memory $16_{i+1,j}$ and a calculator $18_{i+1,j}$ for dynamically controlling throughput set points; the node $N_{i+1,j+1}$ comprises a processor $P_{i+1,j+1}$ and a router $R_{i+1,j+1}$, with the processor $P_{i+1,j+1}$ comprising a network interface $12_{i+1,j+1}$, processing elements $14_{i+1,j+1}$, a local memory $16_{i+1,j+1}$ and a calculator $18_{i+1,j+1}$ for dynamically controlling throughput set points.

Among the nodes of the network on a chip, for a given routing configuration and activity, some are emitting sources of data packets, others are receiving targets of these data packets and all potentially fulfill a data packet routing function when they are on their path traveled in the network on a chip, i.e. when they are located in a point-to-point transmission channel.

For each point-to-point transmission channel, i.e. for each source of data, a throughput set point must be calculated and updated in order to then be applied by a traffic limiter. This calculation is carried out by the calculators $18_{i,j}$ for dynamically controlling the throughput set points defined previously, in the following way:

for each emitting source of data packets, materialized by one of the processing elements $14_{i,j}$, define an initial value of its throughput set point, with said initial value able to be predefined and/or zero, for each link of the network on a chip solicited by the transmission of data packets, estimate an available throughput margin to be distributed between the non-saturated active sources of which the transmission channel includes this link, for each emitting source of data packets, calculate an update of its throughput set point according to the estimated available throughput margins for the links of its transmission channel, and repeat the two preceding steps as long as the active sources are not all saturated.

As indicated hereinabove, a saturated active source is a source that has data packets to be emitted according to a throughput set point imposed by the traffic limiter and of which at least one link on its transmission channel is saturated. A saturated link is advantageously defined as a link that no longer has any throughput margin available.

With regards to the calculations carried out for the sources, they can be done by the calculators $18_{i,j}$ for dynamically controlling the throughput set points located in the same nodes $N_{i,j}$ as these sources.

With regards to the calculations carried out for the links, they can be done by the calculators $18_{i,j}$ for dynamically controlling the throughput set points located upstream or downstream of these links in the transmission channels concerned.

Figure 2:
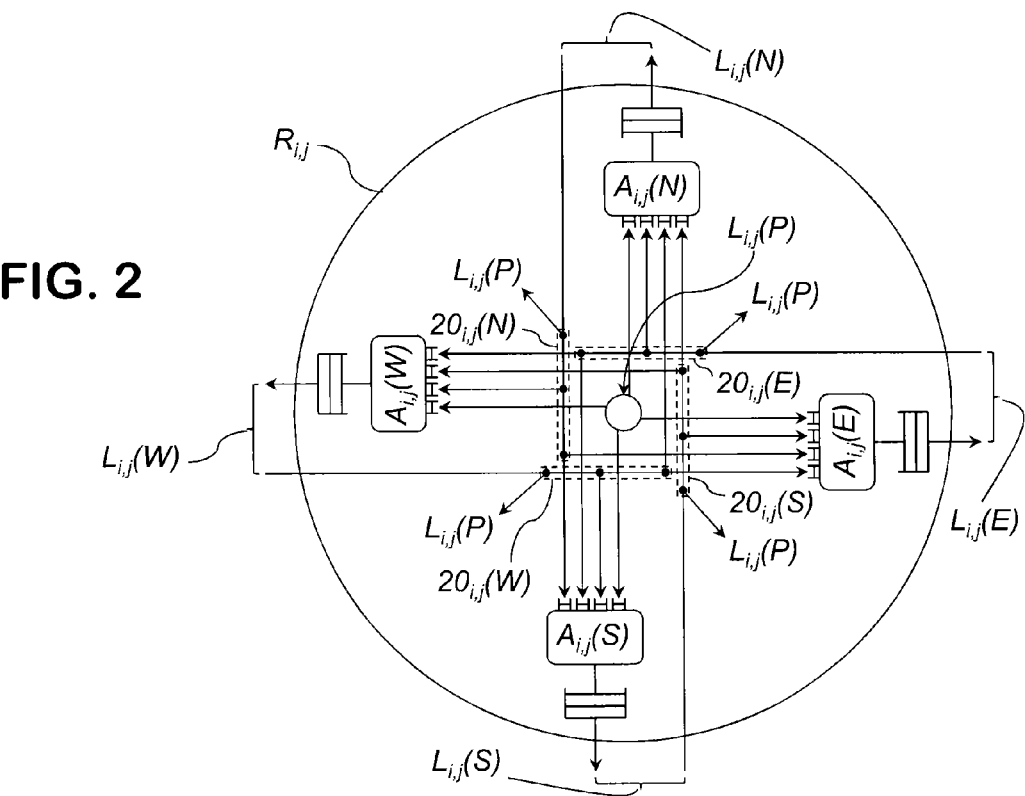

In order to better understand the calculations that can be made on each link, it is suitable to provide details on the possible structure of each router $R_{i,j}$ of the network on a chip. A non-limited example of such a structure is shown in FIG. 2.

Each bidirectional link $L_{i,j}(N)$, $L_{i,j}(S)$, $L_{i,j}(W)$, $L_{i,j}(E)$ to another node of the network is shown with a double incoming and outgoing flow. An additional link $L_{i,j}(P)$ shown in this figure represents the double flow entering from and going to the processor $P_{i,j}$. Each packet of data entering via a link or coming from the processor $P_{i,j}$ is directed to an arbitration module of one of the other four links by a resynchronization and redirection module. Moreover, each arbitration module is preceded with a buffer memory for each incoming flow and followed by an output buffer memory. As such, any data packet arriving via the link $L_{i,j}(N)$ is directed by a resynchronization and redirection module $20_{i,j}(N)$ to one of the four other links $L_{i,j}(S)$, $L_{i,j}(W)$, $L_{i,j}(E)$ or $L_{i,j}(P)$ according to the transmission channel that it has to follow, i.e. to an input buffer memory of the corresponding arbitration module $A_{i,j}(S)$, $A_{i,j}(W)$, $A_{i,j}(E)$ or $A_{i,j}(P)$ (with the latter not being shown in FIG. 2 as a concern for the clarity of the drawing). Any data packet arriving via the link $L_{i,j}(S)$ is directed by a resynchronization and redirection module $20_{i,j}(S)$ to one of the four other links $L_{i,j}(N)$, $L_{i,j}(E)$ or $L_{i,j}(P)$, i.e. to an input buffer memory of the corresponding arbitration module $A_{i,j}(N)$, $A_{i,j}(W)$, $A_{i,j}(E)$ or $A_{i,j}(P)$. Any data packet arriving via the link $L_{i,j}(W)$ is directed by a resynchronization and redirection module $20_{i,j}(W)$ to one of the four other links $L_{i,j}(N)$, $L_{i,j}(S)$, $L_{i,j}(E)$ or $L_{i,j}(P)$, i.e. to an input buffer memory of the corresponding arbitration module $A_{i,j}(N)$, $A_{i,j}(S)$, $A_{i,j}(E)$ or $A_{i,j}(P)$. Any data packet arriving via the link $L_{i,j}(E)$ is directed by a resynchronization and redirection module $20_{i,j}(E)$ to one of the four other links $L_{i,j}(N)$, $L_{i,j}(S)$, $L_{i,j}(W)$ or $L_{i,j}(P)$, i.e. to an input buffer memory of the corresponding arbitration module $A_{i,j}(N)$, $A_{i,j}(S)$, $A_{i,j}(W)$ or $A_{i,j}(P)$. Finally, any data packet arriving via the link $L_{i,j}(P)$ is directed by a resynchronization and redirection module $20_{i,j}(P)$ (not shown in FIG. 2 as a concern for the clarity of the drawing) to one of the four other links $L_{i,j}(N)$, $L_{i,j}(S)$, $L_{i,j}(W)$ or $L_{i,j}(E)$, i.e. to an input buffer memory of the corresponding arbitration module $A_{i,j}(N)$, $A_{i,j}(S)$, $A_{i,j}(W)$ or $A_{i,j}(E)$.

The arbitration modules $A_{i,j}(N)$, $A_{i,j}(S)$, $A_{i,j}(W)$, $A_{i,j}(E)$ and $A_{i,j}(P)$ operate for example according to the well-known Round-Robin principle.

In accordance with this structure of each router $R_{i,j}$, it is understood why each link of the network on a chip can be considered as the association of a physical point-to-point connection, between two adjacent nodes in a certain direction, and at least one buffer memory (in particular either the output buffer memory of the arbitration module located in the source node of the link, or any one of the input buffer memories of the arbitration modules located in the destination node of the link).

It is therefore also understood why it is advantageous to take into consideration not only the maximum throughput capacity of the link (linked to the capacity of its physical connection), but also its maximum local absorption capacity of possible sporadic overflows of the throughput set points (linked to the capacity of its buffer memory or memories), when it is desired to estimate the available throughput margin of this link for a given routing configuration and given throughput set points. Indeed, it was shown in the aforementioned article of Cruz that for a given throughput set point, the sporadic overflows have a ceiling at a threshold value that depends on this throughput set point, in such a way that it can be taken into account in establishing a margin between this threshold value and the capacity of the link to absorb the sporadic overflows of the throughput set point.

As such, in accordance with the invention, for each link lnk of the network on a chip solicited by the transmission of data packets, its available throughput margin to be distributed is estimated using:

a first margin $rc_{lnk}$ calculated based on a maximum throughput capacity $C_{lnk}$ of the link, with this first margin resulting for example from the difference between the sum of the throughput set points of the transmission channels that pass through this link and its maximum throughput capacity, and a second margin $rd_{lnk}$ calculated based on a maximum local absorption capacity, by a buffer memory, of possible sporadic overflows of the throughput set points of the transmission channels that pass through this link, with this second margin resulting for example from a difference between a function of the throughput set points of the transmission channels that pass through this link and its maximum local absorption capacity.

With regards to the first margin $rc_{lnk}$, if $CC_{lnk}$ is noted as the set of transmission channels ch which include the link lnk, $\rho_{ch}$ the current values of the throughput set points of these transmission channels and $\epsilon$ a residual constant margin below which it is considered that the available throughput margin to be distributed is zero, then it can be defined in the following way:

$$rc_{lnk} = C_{lnk} - \varepsilon - \sum_{ch \in CC_{lnk}} \rho_{ch} \qquad (1)$$

With regards to the second margin $rd_{lnk}$, it is shown that it can have the following similar form:

$$rd_{lnk} = BF_{lnk} - \epsilon - f(\{\rho_{ch}, ch \in CC_{lnk}\}) \qquad (2)$$

In this equation, $BF_{lnk}$ is a value of the maximum local absorption capacity proper to the link lnk and which depends on the size of the buffer memory that is associated with it (which itself depends on the buffer memories of the routers as has been seen in reference to FIG. 2), but also depending on other parameters of the network on a chip such as the maximum length of the data packets transiting in the network and the number of contributing flows on the link lnk.

In this equation also, $f(\{\rho_{ch}, ch \in CC_{lnk}\})$ is the general expression of a function, to be determined, of the set of values of the throughput set points of the transmission channels passing through the link lnk. This expression depends in particular on the arbitration discipline chosen, on the chosen throughput control at the source and on other parameters of the network on a chip.

It is shown in particular that it takes a linear form when the arbitration discipline chosen is of the "work conserving" type, i.e. when the emission of a source of eligible traffic remains inactive only when its incoming queue is empty. In this case, the expression of the second margin $rd_{lnk}$ becomes more simply:

$$rd_{lnk} = BF_{lnk} - \varepsilon - \sum_{ch \in CC_{lnk}} D_{ch,lnk} \cdot \rho_{ch} \qquad (3)$$

In this equation, each value $D_{ch,lnk}$ is a coefficient to be determined itself resulting from a sum of coefficients proper to all of the links located upstream of the link lnk in the set $CC_{lnk}$.

By way of a non-restricted example, details shall now be provided on a calculation of $BF_{lnk}$ and of the coefficients $D_{ch,lnk}$, in the case of a throughput control at the source via a sliding window.

When the arbitration discipline is "work conserving", it is known that the following inequality has to be satisfied:

$$\sum_{ch \in CC_{lnk}} \left( \sigma_{ch} + \sum_{l \in RR_{ch,lnk}} d_{l,ch} \cdot \rho_{ch} \right) \leq QSIZE \qquad (4)$$

In this inequality, $\sigma_{ch}$ is the ceiling threshold value of the possible sporadic overflows in light of the throughput set point $\rho_{ch}$ of the transmission channel ch, such as disclosed in the aforementioned article of Cruz.

In this inequality also, $RR_{ch,lnk}$ is the set of the links passed through upstream of the link lnk in the transmission channel ch, QSIZE is the size of the buffer memory associated with the link lnk and $d_{l,ch}$ is a coefficient calculated in the following way:

$$d_{l,ch} = (nd_l - 1) \cdot PSIZE \qquad (5)$$

In this equation, $nd_l$ is the number of contributing directions on the buffer memory associated with the link l and PSIZE is the maximum size of the data packets expressed in the same unit as QSIZE (i.e. flits, bytes or others).

In the particular case of a throughput control at the source via a sliding window, the controller complies with the throughput set point $\rho_{ch}$ on a sliding window of length Tw by limiting the number of units of data packets (i.e. flits, bytes or others) with a maximum injection instant throughput of a constant value noted as DMAX. It is shown that the expression $\Sigma_{ch \in CC_{lnk}} \sigma_{ch}$ of the inequality (4) then has the following form:

$$\sum_{ch \in CC_{lnk}} \sigma_{ch} = \sum_{ch \in CC_{lnk}} \rho_{ch} \cdot \left(1 - \frac{\rho_{ch}}{DMAX}\right) \cdot Tw \qquad (6)$$

This expression is not linear in $\rho_{ch}$. However, by noting $N_{lnk}$ the number of contributing sources to the link lnk, i.e. the number of transmission channels passing through the link lnk, or in other words the number of elements ch in the set $CC_{lnk}$, it can cleverly be simplified by remarking that the upper limit of the expression (6) is reached when $\forall$ ch, $$\rho_{ch} = \frac{DMAX}{NS_{lnk}}.$$

The following is obtained:

$$\sup_{\rho_{ch}} \left( \sum_{ch \in CC_{lnk}} \sigma_{ch} \right) = \qquad (7)$$

$$\sum_{ch \in CC_{lnk}} \frac{DMAX}{N_{lnk}} \cdot \left(1 - \frac{\frac{DMAX}{N_{lnk}}}{DMAX}\right) \cdot Tw = \frac{(N_{lnk} - 1)}{N_{lnk}} \cdot DMAX \cdot Tw$$

The inequality (4) can then be advantageously replaced with a more constraining but linear inequality in $\rho_{ch}$:

$$\sum_{ch \in CC_{lnk}} \sum_{l \in RR_{ch,lnk}} d_{l,ch} \cdot \rho_{ch} \leq QSIZE - \frac{(N_{lnk} - 1)}{N_{lnk}} \cdot DMAX \cdot Tw \qquad (8)$$

By noting $$BF_{lnk} = QSIZE - \frac{(N_{lnk} - 1)}{N_{lnk}} \cdot DMAX \cdot Tw \qquad (9)$$

and $$D_{ch,lnk} = \sum_{l \in RR_{ch,lnk}} d_{l,ch}, \qquad (10)$$

this inequality is obtained:

$$\sum_{ch \in CC_{lnk}} D_{ch,lnk} \cdot \rho_{ch} \leq BF_{lnk}, \qquad (11)$$

from which the expression (3) is constructed.

The operation of the data processing device 10 for dynamically controlling the throughput set points shall now be described in reference to FIG. 3 and in the particular example of which the detailed are provided hereinabove where the equations (1) and (3) apply.

During a first step 100 of initialization, an iteration counter i is initialized to 0. All of the inactive sources, i.e. that do not have any data packet to be transmitted, are declared as saturated. All of the active sources are declared as non-saturated and their throughput set points are initialized to values noted as $\rho_{ch,0}$. These initial values are for example zero, or chosen as non-zero but in such a way as to comply with the throughput capacity constraints of the solicited links (these constraints will be referred to as "capacity constraints" in what follows) and the capacity constraints in absorbing sporadic overflows of throughput set points in the solicited links (these constraints will be referred to as "distortion constraints" in what follows). The number of active sources is noted N. This number N is therefore also the number of transmission channels and of throughput set points, with the index ch which designates a transmission channel then varying from 1 to N. The number of links solicited by these N active sources is noted L. L is therefore the number of links included in the N transmission channels, with the index lnk which designates a link of this set of links then varying from 1 to L.

The step of initialization 100 is followed by a step 105 of incrementing the iteration counter i by one unit.

During a following step 110 executed at the iteration i, for each link lnk, 1≤lnk≤L, of the network on a chip solicited by the transmission of data packets, an available throughput margin, to be distributed between the non-saturated active sources of which the transmission channel includes this link, is estimated. More precisely, this is an available throughput margin for each one of these sources, identical for all of the sources concerned and noted as $\Delta_{lnk,i}$, which is estimated.

The execution of the step 110 is distributed over the L links solicited by the N active sources. It can be broken down into L parallel steps $112_1, \ldots, 112_{lnk}, \ldots, 112_L$ of calculating margins $rc_{lnk}$ defined in the equation (1), followed by L parallel steps $114_1, \ldots, 114_{lnk}, \ldots, 114_L$ of calculating margins $rd_{lnk}$ defined in the equation (3), followed by L parallel steps $116_1, \ldots, 116_{lnk}, \ldots, 116_L$ of calculating available throughput margins for each one of the non-saturated active sources.

More precisely, at the iteration i, each margin $rc_{lnk}$ is noted as $rc_{lnk,i}$ and depends on the last values of throughput set points determined at the iteration i−1 and noted as $\rho_{ch,i-1}$. This results in that the equation (1) becomes:

$$rc_{lnk,i} = C_{lnk} - \varepsilon - \sum_{ch \in CC_{lnk}} \rho_{ch,i-1} \quad (12)$$

It is therefore this calculation defined by the equation (12) which is carried out in the steps $112_1, \ldots, 112_{lnk}, \ldots, 112_L$. Note in particular that the maximum throughput capacity $C_{lnk}$ of the link lnk is a predetermined constant for this link which does not depend on the iteration i. Likewise, the set $CC_{lnk}$ of the transmission channels which include the link lnk also does not depend on the iteration i.

Also more precisely, at the iteration i, the margin $rd_{lnk}$ is noted as $rd_{lnk,i}$ and depends on the last values of throughput set points determined at the iteration i−1 and noted as $\rho_{ch,i-1}$. This results in that the equation (3) becomes:

$$rd_{lnk,i} = BF_{lnk} - \varepsilon - \sum_{ch \in CC_{lnk}} D_{ch,lnk} \cdot \rho_{ch,i-1} \quad (13)$$

It is therefore this calculation defined by the equation (13) which is carried out in the steps $114_1, \ldots, 114_{lnk}, \ldots, 114_L$. Note in particular that the maximum local absorption capacity $BF_{lnk}$ of the possible sporadic overflows of the throughput set points and the coefficients $D_{ch,lnk}$ of the link lnk are predetermined constants for this link which do not depend on the iteration i.

During the following steps $116_1, \ldots, 116_{lnk}, \ldots, 116_L$, the available throughput margins $\Delta_{lnk,i}$ are estimated using the values $rc_{lnk,i}$ and $rd_{lnk,i}$ calculated in the steps $112_1, \ldots, 112_{lnk}, \ldots, 112_L$ and $114_1, \ldots, 114_{lnk}, \ldots, 114_L$. By way of a non-restricted example, each available throughput margin for each one of the non-saturated active sources contributing to the load of any one of the links lnk can be calculated in the step $116_{lnk}$ in the following way:

$$\Delta_{lnk,i} = \text{Min}(\Delta c_{lnk,i}, \Delta d_{lnk,i}) \quad (14)$$

with:

$$\Delta c_{lnk,i} = \frac{rc_{lnk,i}}{NS_{lnk,i}} \quad (15)$$

and:

$$\Delta d_{lnk,i} = \frac{rd_{lnk,i}}{\sum_{ch \in CCNS_{lnk,i}} D_{ch,lnk}} \quad (16)$$

In the equation (15), $NS_{lnk,i}$ is the number of non-saturated active sources contributing to the link lnk at the iteration i. This number is updated, for example at each step $116_{lnk}$ or before, based on feedback from each active source indicating to the links to which it sends data packets when it is becoming saturated. The equation (15) therefore represents a fair distribution of the margin $rc_{lnk,i}$ of the link lnk between its non-saturated active sources.

In the equation (16), $CCNS_{lnk,i}$ is all of the transmission channels including the link lnk of which the sources are active and not saturated. This set is also updated, for example at each step $116_{lnk}$ or before, on the same basis as the number $NS_{lnk,i}$. The equation (16) therefore represents a fair distribution of the margin $rd_{lnk,i}$ of the link lnk between its non-saturated active sources.

Following the steps $116_1, \ldots, 116_{lnk}, \ldots, 116_L$, the values of the margins $\Delta_{lnk,i}$ are transmitted to all of the sources concerned (step 118).

During a following step 120 also executed at the iteration i, for each transmission channel of the network on a chip of which the source is active and not saturated (i.e. at most 1≤ch≤N at the first iteration, with the number of these transmission channels able to decrease at each iteration), an updating of the corresponding throughput set point is carried out. This updating is executed by the source concerned.

The execution of the step 120 is carried out for the non-saturated active sources at the iteration i, i.e. for at most the N active sources. It can be broken down into at most N parallel steps $122_1, \ldots, 122_{ch}, \ldots, 122_N$ of recovering the values of the margins $\Delta_{lnk,i}$ calculated in the steps $116_1, \ldots, 116_{lnk}, \ldots, 116_L$, followed by at most N parallel steps $124_1, \ldots, 124_{ch}, \ldots, 124_N$ of calculating new throughput set points of the not yet saturated active sources.

More precisely, at each step $122_{ch}$ executed for the non-saturated active source of the transmission channel ch, all of the values of margins $\Delta_{lnk,i}$ coming from the links lnk included in the transmission channel ch are received and a minimum available margin value $\Delta_{ch,i}$ is calculated in the following way:

$$\Delta_{ch,i} = \min_{lnk \in ch}(\Delta_{lnk,i}) \quad (17)$$

In this step, an active source becomes saturated if its value $\Delta_{ch,i}$ is zero, i.e. if at least one link on its transmission channel is saturated (i.e. no available margin on this link). This saturation information must be communicated to all of the links lnk concerned, i.e. all of the links of the transmission channel ch of the active source that is becoming saturated. Furthermore, such a saturated active source no longer updates its throughput set point which remains constant and no longer expects any new values for margins coming from the links of its transmission channel.

Also more precisely, at each step $124_{ch}$ executed for the non-saturated active source of the transmission channel ch, the throughput set point is updated in the following way:

$$\rho_{ch,i} = \rho_{ch,i-1} + \Delta_{ch,i} \quad (18)$$

It then goes to a test step 125 during which the following decision is taken:
  if there is still at least one non-saturated active source, the method reverts to the step 105 of incrementing the counter i for the execution of another iteration,
  if there is no longer any non-saturated active source, the method reverts to a final step 130 of waiting for a change in any routing configuration.

No particular dynamic control action of the throughput set points is carried out in the step 130. On the other hand, as soon as a change occurs in the activity of one of the sources of data packets or more generally in the routing configuration of the network on a chip, this change is detected and the method reverts to the step 100 for another dynamic control of the corresponding throughput set points.

The iterative method described hereinabove is therefore designed to progressively saturate all of the active sources. But it is further designed so that the capacity and distortion constraints in these links are never breached. This is shown through recurrence.

Suppose that the capacity constraint of any one of the links lnk is satisfied at the iteration i−1. This results in the following inequality:

$$\sum_{ch \in CC_{lnk}} \rho_{ch,i-1} \leq C_{lnk} \quad (19)$$

If $RR_{lnk}$ is noted as the set of links that belong to the transmission channels to which the link lnk also belongs to, in light also of the hypothesis of recurrence (19) and in supposing that all of the links of this set have the same maximum throughput capacity $C_{lnk}$, the iterative method described hereinabove imposes the following inequality for any transmission channel ch including the link lnk:

$$\rho_{ch,i} \leq \rho_{ch,i-1} + \underset{l \in RR_{lnk}}{\text{Min}} \frac{C_{lnk} - \sum_{c \in CC_l} \rho_{c,i-1}}{NS_{lnk,i-1}} \quad (20)$$

By noting $CCS_{lnk,i-1}$ as the set of transmission channels including the link lnk of which the sources are active and saturated at the iteration i−1 ($CCNS_{lnk,i-1}$ being the already defined set of the transmission channels including the link lnk of which the sources are active and non-saturated at the iteration i−1), and by remarking that the throughput set points of the saturated sources do not change, the following results:

$$\sum_{ch \in CC_{lnk}} \rho_{ch,i} = \sum_{ch \in CCS_{lnk,i-1}} \rho_{ch,i-1} + \sum_{ch \in CCNS_{lnk,i-1}} \rho_{ch,i} \quad (21)$$

Moreover, by adding the inequality (20) over all of the transmission channels of which the sources are active and non-saturated at the iteration i−1, the following inequality is obtained:

$$\sum_{ch \in CCNS_{lnk,i-1}} \rho_{ch,i} \leq \quad (22)$$

$$\sum_{ch \in CCNS_{lnk,i-1}} \rho_{ch,i-1} + \sum_{ch \in CCNS_{lnk,i-1}} \underset{l \in RR_{lnk}}{\text{Min}} \frac{C_{lnk} - \sum_{c \in CC_l} \rho_{c,i-1}}{NS_{lnk,i-1}}$$

The inequality (22) can also be written in the following way:

$$\sum_{ch \in CCNS_{lnk,i-1}} \rho_{ch,i} \leq \sum_{ch \in CCNS_{lnk,i-1}} \rho_{ch,i-1} + \quad (23)$$

$$\sum_{ch \in CCNS_{lnk,i-1}} \frac{C_{lnk}}{NS_{lnk,i-1}} - \sum_{ch \in CCNS_{lnk,i-1}} \underset{l \in RR_{lnk}}{\text{Max}} \frac{\sum_{c \in CC_l} \rho_{c,i-1}}{NS_{lnk,i-1}}$$

By remarking that $NS_{lnk,i-1} = \text{Card}(CCNS_{lnk,j-1})$, wherein Card is the cardinal function indicating the number of elements in a set, the inequality (23) is simplified as:

$$\sum_{ch \in CCNS_{lnk,i-1}} \rho_{ch,i} \leq \sum_{ch \in CCNS_{lnk,i-1}} \rho_{ch,i-1} + C_{lnk} - \underset{l \in RR_{lnk}}{\text{Max}} \left( \sum_{c \in CC_l} \rho_{c,i-1} \right) \quad (24)$$

By combining the equation (21) and the inequality (24), the following is obtained:

$$\sum_{ch \in CC_{lnk}} \rho_{ch,i} \leq \sum_{ch \in CCS_{lnk,i-1}} \rho_{ch,i-1} + \quad (25)$$

$$\sum_{ch \in CCNS_{lnk,i-1}} \rho_{ch,i-1} + C_{lnk} - \underset{l \in RR_{lnk}}{\text{Max}} \left( \sum_{c \in CC_l} \rho_{c,i-1} \right)$$

The inequality (25) can also be written in the following way:

$$\sum_{ch \in CC_{lnk}} \rho_{ch,i} \leq \left[ \sum_{ch \in CC_{lnk}} \rho_{ch,i-1} - \underset{l \in RR_{lnk}}{\text{Max}} \left( \sum_{c \in CC_l} \rho_{c,i-1} \right) \right] + C_{lnk} \quad (26)$$

Leading to:

$$\sum_{ch \in CC_{lnk}} \rho_{ch,i} \leq C_{lnk} \quad (27)$$

This means that when the capacity constraint of any one of the links lnk is satisfied at the iteration i−1, then it is also satisfied at the iteration i. Through recurrence, this capacity constraint is therefore respected at all of the iterations from the moment when the initial conditions of the step 100 satisfy it.

Similarly, it is shown through recurrence that the distortion constraint in any one of the links lnk is never breached.

Suppose that the distortion constraint in any one of the links lnk is satisfied at the iteration i−1. This results in the following inequality:

$$\sum_{ch \in CC_{lnk}} D_{ch,lnk} \cdot \rho_{ch,i-1} \leq BF_{lnk} \quad (28)$$

In light of the hypothesis of recurrence (28), the iterative method described hereinabove imposes the following inequality for any transmission channel ch including the link lnk:

$$\rho_{ch,i} \leq \rho_{ch,i-1} + \underset{l \in RR_{lnk}}{\text{Min}} \frac{BF_l - \sum_{c \in CC_l} D_{c,l} \cdot \rho_{c,i-1}}{\sum_{ch \in CCNS_{l,i-1}} D_{ch,l}} \quad (29)$$

By remarking that the throughput set points of the saturated sources do not change, the following results:

$$\sum_{ch \in CC_{lnk}} D_{ch,lnk} \cdot \rho_{ch,i} = \quad (30)$$

$$\sum_{ch \in CCS_{lnk,i-1}} D_{ch,lnk} \cdot \rho_{ch,i-1} + \sum_{ch \in CCNS_{lnk,i-1}} D_{ch,lnk} \cdot \rho_{ch,i}$$

Moreover, by adding the inequality (29) over all of the transmission channels of which the sources are active and non-saturated at the iteration i−1, and by weighting with the coefficients, $D_{ch,lnk}$, the following inequality is obtained:

$$\sum_{ch \in CCNS_{lnk,i-1}} D_{ch,lnk} \cdot \rho_{ch,i} \le \sum_{ch \in CCNS_{lnk,i-1}} D_{ch,lnk} \cdot \rho_{ch,i-1} + \sum_{ch \in CCNS_{lnk,i-1}} D_{ch,lnk} \cdot \min_{l \in RR_{lnk}} \frac{BF_l - \sum_{c \in CC_l} D_{c,l} \cdot \rho_{c,i-1}}{\sum_{ch \in CCNS_{l,i-1}} D_{ch,l}} \quad (31)$$

By combining the equation (30) and the inequality (31), the following is obtained:

$$\sum_{ch \in CC_{lnk}} D_{ch,lnk} \cdot \rho_{ch,i} \le \qquad (32)$$
$$\sum_{ch \in CCS_{lnk,i-1}} D_{ch,lnk} \cdot \rho_{ch,i-1} + \sum_{ch \in CCNS_{lnk,i-1}} D_{ch,lnk} \cdot \rho_{ch,i-1} +$$
$$\sum_{ch \in CCNS_{lnk,i-1}} D_{ch,lnk} \cdot \min_{l \in RR_{lnk}} \frac{BF_l - \sum_{c \in CC_l} D_{c,l} \cdot \rho_{ch,i-1}}{\sum_{ch \in CCNS_{l,i-1}} D_{ch,l}}$$

In particular, the fact that the link lnk belongs to all of the transmission channels of the set $RR_{lnk}$ makes it possible to simplify the inequality (32):

$$\sum_{ch \in CC_{lnk}} D_{ch,lnk} \cdot \rho_{ch,i} \le \qquad (33)$$
$$\sum_{ch \in CCS_{lnk,i-1}} D_{ch,lnk} \cdot \rho_{ch,i-1} + \sum_{ch \in CCNS_{lnk,i-1}} D_{ch,lnk} \cdot \rho_{ch,i-1} +$$
$$\sum_{ch \in CCS_{lnk,i-1}} D_{ch,lnk} \cdot \frac{BF_{lnk} - \sum_{c \in CC_{lnk}} D_{c,lnk} \cdot \rho_{c,i-1}}{\sum_{ch \in CCNS_{lnk,i-1}} D_{ch,lnk}}$$

Which in turn is simplified as:

$$\sum_{ch \in CC_{lnk}} D_{ch,lnk} \cdot \rho_{ch,i} \le \qquad (34)$$
$$\sum_{ch \in CC_{lnk}} D_{ch,lnk} \cdot \rho_{ch,i-1} + BF_{lnk} - \sum_{ch \in CC_{lnk}} D_{ch,lnk} \cdot \rho_{ch,i-1}$$

Leading to:

$$\sum_{ch \in CCS_{lnk}} D_{ch,lnk} \cdot \rho_{ch,i} \le BF_{lnk} \qquad (35)$$

This means that when the distortion constraint of any one of the links lnk is satisfied at the iteration i−1, it is then also satisfied at the iteration i. By recurrence, this constraint is therefore complied with at all of the iterations starting from the moment when the initial conditions of the step 100 satisfy it.

Figure 3:
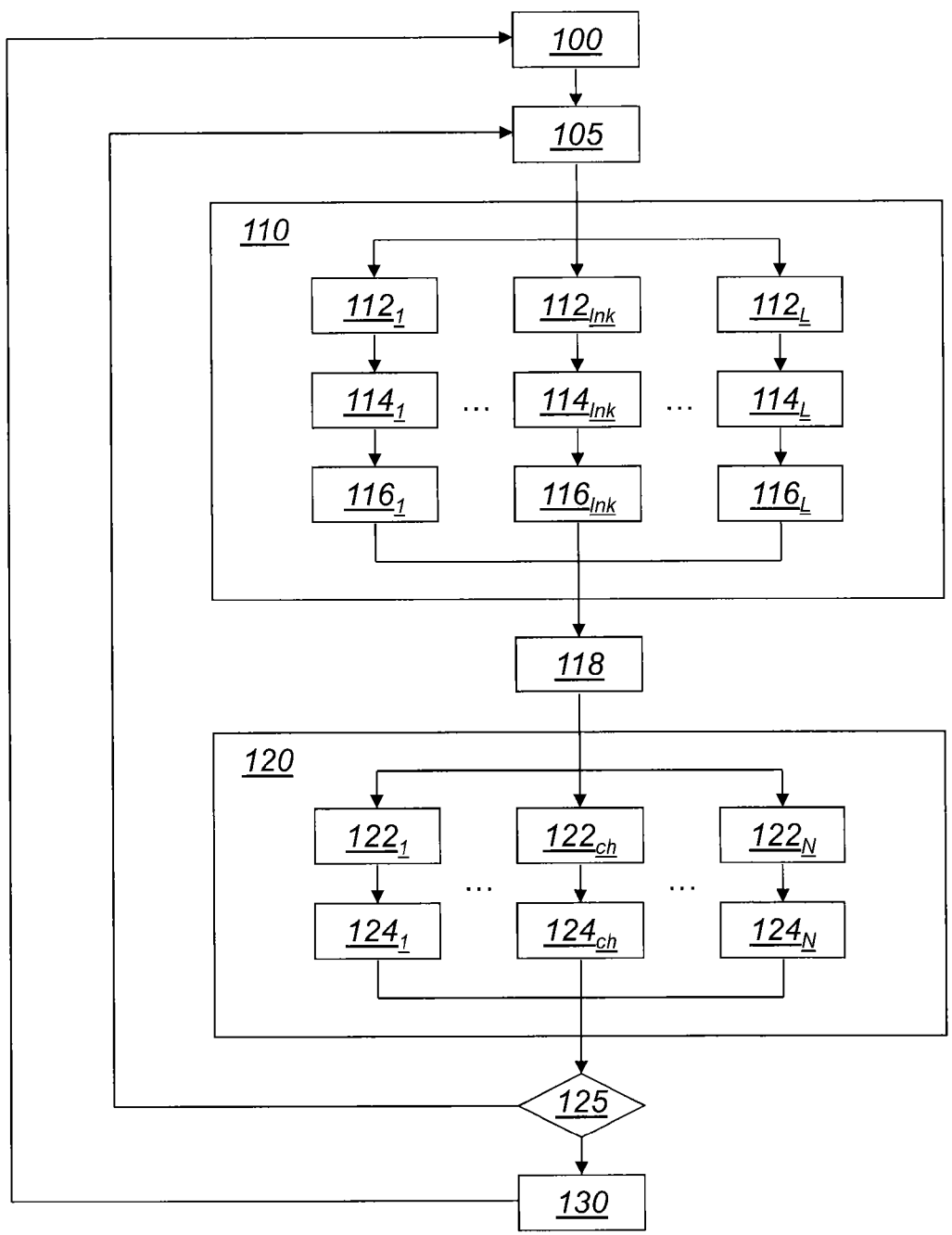
FIG. 3 shows the successive steps of a method for dynamically controlling the throughput set points implemented in the data processing device of FIG. 1.

It is suitable now to underline that the capacity and distortion constraints are effectively complied with at all of the iterations of the method of FIG. 3 with the condition that, for any i≥1:

all of the updates of the throughput set points of the iteration i−1 are effectively calculated (in step 100 for the first iteration of the method, or in the steps 124$_1$, ..., 124$_{ch}$, ..., 124$_N$ of the iteration i−1 for the following iterations) when the step 110 of the iteration i has to be executed, and all of the values of margins $\Delta_{lnk,i}$ of the iteration i are effectively known when the step 120 of the iteration i has to be executed.

In practice, a synchronization mechanism must be implemented in order to provide for these two conditions.

Figure 4:
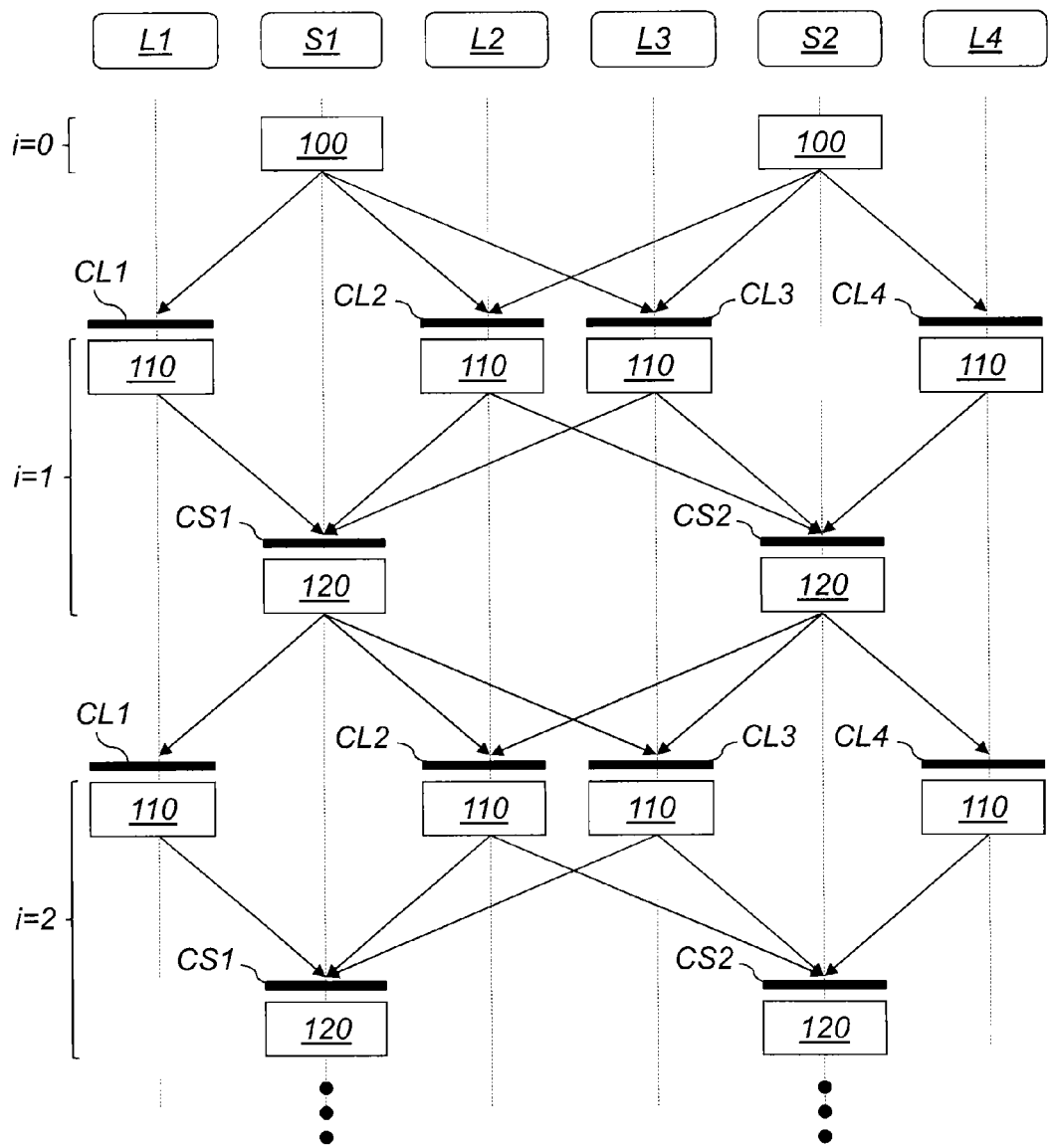
FIG. 4 is a simplified example of the execution of the control method of FIG. 3, with the implementation of a synchronization mechanism according to a first embodiment of the invention, FIGS. 5 and 6 diagrammatically show the operations of links and sources of the data processing device of FIG. 1 for the implementing of the synchronization mechanism of FIG. 4.

According to a first embodiment shown in FIG. 4, the synchronization mechanism can be provided by synchronization barriers carried out using message down-counters. A simple example with two sources S1, S2 and four links L1, L2, L3, L4 shared between these two sources is more precisely shown in FIG. 4. In this simple example, a first transmission channel, associated with the source S1, comprises the links L1, L2, L3 travelled for example in this order and a second transmission channel, associated with the source S2, comprises the links L2, L3, L4 travelled for example in this order. The synchronization mechanism which shall now be described for this simple example can obviously very easily be generalized to any routing configuration.

During the step 100 (i=0), the throughput set points of the sources S1 and S2 are initialized. The initialized value $\rho_{1,0}$ of the throughput set point of the source S1 must be sent to the links L1, L2 and L3. The initialized value $\rho_{2,0}$ of the flow set point of the source S2 must be sent to the links L2, L3 and L4.

On each link lnk, a message down-counter is defined. Its value is initialized to the number $NS_{lnk,0}$ of non-saturated active sources of which the transmission channels include this link lnk. Before execution of the first iteration (i=1), no active source is saturated. $NS_{lnk,0}$ therefore corresponds to the total number of active sources of which the transmission channels include the link lnk. In the example shown, the message down-counter CL1 of the link L1 is then initialized to the value $NS_{L1,0}=1$ (only the source S1 uses the link L1), the message down-counter CL2 of the link L2 is initialized to the value $NS_{L2,0}=2$ (the sources S1 and S2 use the link L2), the message down-counter CL3 of the link L3 is initialized to the value $NS_{L3,0}=2$ (the sources S1 and S2 use the link L3) and the message down-counter CL4 of the link L4 is initialized to the value $NS_{L4,0}=1$ (only the source S2 uses the link L4). Each time a link receives an expected throughput set point from one of its non-saturated active sources, it decrements its message down-counter by one unit. When the message down-counter reaches the zero value, the corresponding link can begin the execution of the step 110 of the iteration i=1. As such, the link L1 proceeds with executing the step 110 of the iteration i=1 when its message down-counter CL1 initially at the value $NS_{L1,0}$ reaches the zero value, the link L2 proceeds with executing the step 110 of the iteration i=1 when its message down-counter CL2 initially at the value $NS_{L2,0}$ reaches the zero value, the link L3 proceeds with executing the step 110 of the iteration i=1 when its message down-counter CL3 initially at the value $NS_{L3,0}$ reaches the zero value and the link L4 proceeds with executing the step 110 of the iteration i=1 when its message down-counter CL4 initially at the value $NS_{L4,0}$ reaches the zero value. Moreover, each time that a link receives an expected throughput set point from one of its active sources, the latter indicates to it if this throughput set point renders it saturated. In this case, at the iteration i=1 the value $NS_{lnk,1}$ initialized to $NS_{lnk,0}$ is decremented by one unit each time that an active source indicates that it is becoming saturated, this saturated active source planning to no longer send any message at the following iterations.

After the execution of the step 110 of the iteration i=1, each link lnk must transmit its margin value $\Delta_{lnk,1}$ to all of its non-saturated active sources.

On each source, a message down-counter is also defined. Its value is initialized to the number of links in its transmission channel. In the example shown, the message down-counter CS1 of the source S1 is then initialized to the value 3 (three links L1, L2 and L3) and the message down-counter CS2 of the source S2 is initialized to the value 3 (three links L2, L3 and L4). Each time that a source receives a margin value $\Delta_{lnk,1}$ from one of the links in its transmission channel, it decrements its message down-counter by one unit. When the message down-counter reaches the zero value, the corresponding source can begin the execution of the step 120 of the iteration i=1. As such, the source S1 proceeds with executing the step 120 of the iteration i=1 when its message down-counter CS1 initially at the value 3 reaches the zero value and the source S2 proceeds with executing the step 120 of the iteration i=1 when its message down-counter CS2 initially at the value 3 reaches the zero value.

After the execution of the step 120 of the iteration i=1, each source has to transmit its new value of the throughput set point to all of the links of its transmission channel and indicate to them if it is saturated, for the possible execution of another iteration (i=2) if there remains at least one non-saturated active source. As such, the updated value $\rho_{1,1}$ of the throughput set point of the source S1 must be sent to the links L1, L2 and L3. The updated value $\rho_{2,1}$ of the throughput set point of the source S2 must be sent to the links L1, L2 and L3.

The second iteration i=2 is shown in the example of FIG. 4. In accordance with this second iteration, the message down-counter of each link lnk is initialized to the value $NS_{lnk,1}$ calculated at the preceding iteration. Each time a link receives an expected throughput set point from one of its non-saturated active sources, it decrements its message down-counter by one unit. When the message down-counter reaches the zero value, the corresponding link can begin the execution of the step 110 of the iteration i=2. As such, the link L1 proceeds with executing the step 110 of the iteration i=2 when its message down-counter CL1 initially at the value $NS_{L1,1}$ reaches the zero value, the link L2 proceeds with executing the step 110 of the iteration i=2 when its message down-counter CL2 initially at the value $NS_{L2,i}$ reaches the zero value, the link L3 proceeds with executing the step 110 of the iteration i=3 when its message down-counter CL3 initially at the value $NS_{L3,1}$ reaches the zero value and the link L4 proceeds with executing the step 110 of the iteration i=2 when its message down-counter CL4 initially at the value $NS_{L4,1}$ reaches the zero value. Moreover, each time that a link receives an expected throughput set point from one of its active sources, the latter indicates to it if this throughput set point renders it saturated. In this case, at the iteration i=2 the value $NS_{lnk,2}$ initialized to $NS_{lnk,1}$ is decremented by one unit each time that an active source indicates that it is becoming saturated, this saturated active source planning to no longer send any message at subsequent iterations.

After the execution of the step 110 of the iteration i=2, each link lnk must transmit its margin value $\Delta_{lnk,2}$ to all of its non-saturated active sources.

On each source, the message down-counter is again initialized to the number of links in its transmission channel. Each time that a source receives a margin value $\Delta_{lnk,2}$ from one of the links in its transmission channel, it decrements its message down-counter by one unit. When the message down-counter reaches the zero value, the corresponding source can begin the execution of the step 120 of the iteration i=2. As such, the source S1 proceeds with executing the step 120 of the iteration i=2 when its message down-counter CS1 initially at the value 3 reaches the zero value and the source S2 proceeds with executing the step 120 of the iteration i=2 when its message down-counter CS2 initially at the value 3 reaches the zero value.

After the execution of the step 120 of the iteration i=2, each source has to transmit its new value of throughput set point to all of the links of its transmission channel and indicate to them if it is saturated, for the possible execution of another iteration (i=3) if there remains at least one non-saturated active source. As such, the updated value $\rho_{1,2}$ of the throughput set point of the source S1 must be sent to the links L1, L2 and L3. The updated value $\rho_{2,2}$ of the throughput set point of the source S2 must be sent to the links L1, L2 and L3.

The method iterates until the condition of the end of iteration of the test step 125 is satisfied (i.e. no more non-saturated active source).

As such, at any iteration i, on each link lnk, the message down-counter is initialized to the value $NS_{lnk,i-1}$ calculated at the preceding iteration. Each time a link receives an expected throughput set point from one of its non-saturated active sources, it decrements its message down-counter by one unit. When the message down-counter reaches the zero value, the corresponding link can begin the execution of the step 110 of the iteration i. Moreover, each time that a link receives an expected throughput set point from one of its active sources, the latter indicates to it if this throughput set point renders it saturated. In this case, at the iteration i the value $NS_{lnk,i}$ initialized at $NS_{lnk,i-1}$ is decremented by one unit each time that one of the active source indicates that it is becoming saturated, this saturated active source planning to no longer send any message at subsequent iterations.

After the execution of the step 110 of the iteration i, each link lnk must transmit its margin value $\Delta_{lnk,i}$ to all of its non-saturated active sources.

On each source, the message down-counter is again initialized to the number of links in its transmission channel. Each time that a non-saturated active source receives a margin value $\Delta_{lnk,i}$ from one of the links in its transmission channel, it decrements its message down-counter by one unit. When the message down-counter reaches the zero value, the corresponding source can begin the execution of the step 120 of the iteration i. After the execution of the step 120 of the iteration i, each source has to transmit its new value of throughput set point to all of the links of its transmission channel and indicate to them if it is saturated, for the possible execution of another iteration if there remains at least one non-saturated active source.

With regards to the distribution of the aforementioned steps and in reference to FIG. 1:

on each link, the execution of each step 110 for the calculation of the value of the margin is carried out by the calculator $18_{i,j}$ of the communication control module of the node $N_{i,j}$ that corresponds to this link, while the management of the message down-counter is provided by the network interface $12_{i,j}$, on each source, the execution of each step 120 for the updating of the throughput set point is carried out by the calculator $18_{i,j}$ of the communication control module of the node $N_{i,j}$ that corresponds to this source, while the management of the message down-counter is provided by the network interface $12_{i,j}$.

The management of message down-counters can be carried out by identifying messages with a specific label on the Transport layer of the OSI (Open Systems Interconnection) model.

Figure 5:
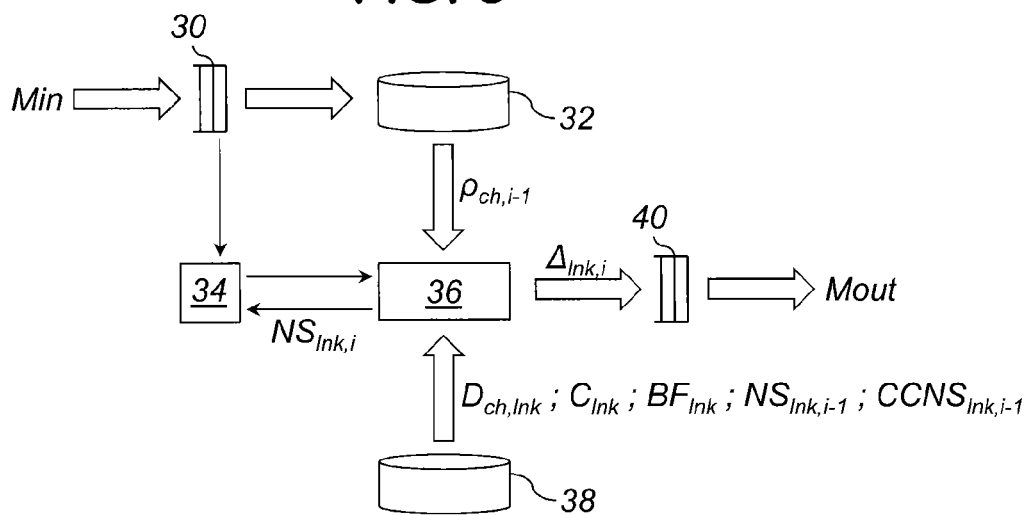

An example of architecture that corresponds to the synchronization mechanism of FIG. 4 such as implemented in any one of the links lnk is shown in FIG. 5.

Any incoming message Min is received by a buffer memory 30 then directed to an intermediate storage zone 32, for example provided in the local memory $16_{i,j}$ of the node $N_{i,j}$ corresponding to the link lnk. This arrival of a message triggers a decrementing of the local down-counter 34. When the local down-counter 34 reaches the zero value, a processing unit 36 is informed of this. This processing unit 36 then recovers all of the messages Min stored in the intermediate storage zone 32, with the latter comprising the throughput set points $\rho_{ch,i-1}$ and any saturation information required for the calculations of the step 110 described hereinabove. It also recovers in memory 38 the other values required for the calculation of the available throughput margin $\Delta_{lnk,i}$ for each contributing source ch of the link lnk, namely: the coefficients $D_{ch,lnk}$, the capacities $C_{lnk}$, $BF_{lnk}$ and the number of non-saturated active sources $NS_{lnk,i-1}$ to be updated as well as the set $CCNS_{lnk,i-1}$. It finally proceeds with the calculations and supplies as output buffer memory 40 a message Mout comprising the value of the margin $\Delta_{lnk,i}$ sent to all of the sources concerned. The end of the calculations causes the re-initialization of the down-counter 34 to the value $NS_{lnk,i}$.

Figure 6:
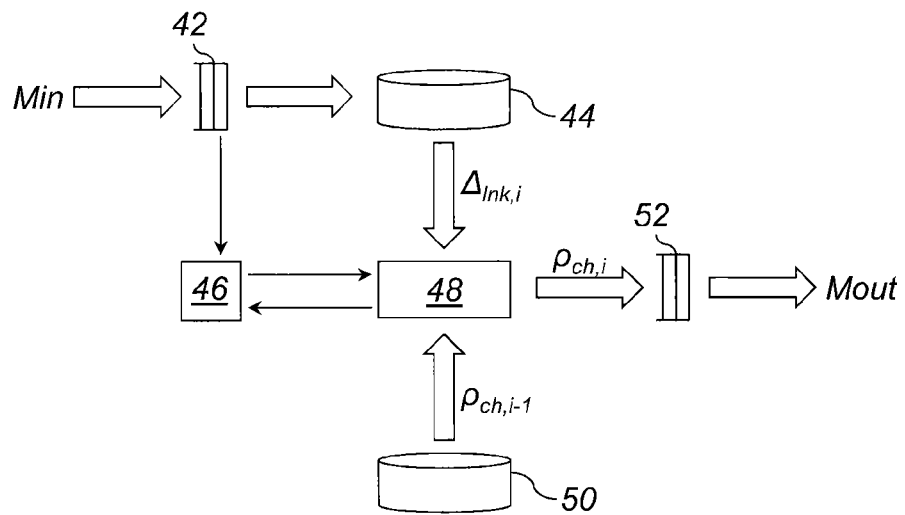

An example of architecture corresponding to the synchronization mechanism of FIG. 4 such as implemented in any one of the sources ch is shown in FIG. 6.

Any incoming message Min is received by a buffer memory 42 then directed to an intermediate storage zone 44, for example provided in the local memory $16_{i,j}$ of the node $N_{i,j}$ that corresponds to the source ch. This arrival of a message triggers a decrementing of the local down-counter 46. When the local down-counter 46 reaches the zero value, a processing unit 48 is informed of this. This processing unit 48 then recovers all of the messages Min stored in the intermediate storage zone 32, with the latter comprising the values of the margins $\Delta_{lnk,i}$ required for the calculations of the step 120 described hereinabove. It also recovers in memory 50 the last value of the throughput set point $\rho_{ch,i-1}$. It finally proceeds with the calculations and supplies as output buffer memory 52 a message Mout comprising the updated value of the throughput set point $\rho_{ch,i}$ sent to all of the links of the transmission channel of the source ch. The end of the calculations causes the re-initialization of the down-counter 46 and the application of the new throughput set point by the traffic limiter concerned.

Figure 7:
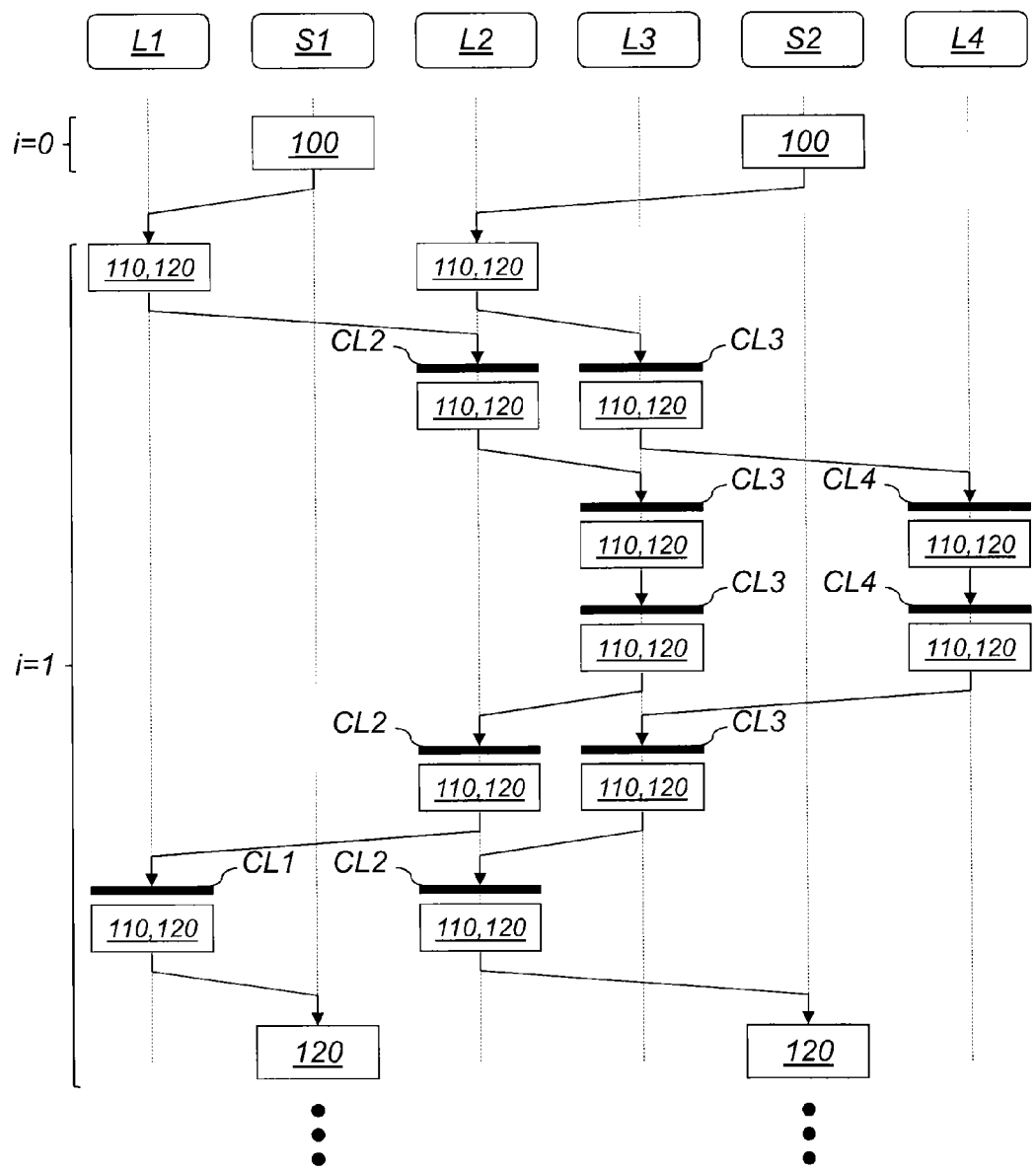
FIG. 7 is a simplified example of the execution of the control method of FIG. 3, with the implementation of a synchronization mechanism according to a second embodiment of the invention, and FIGS. 8 and 9 diagrammatically show the operations of links and sources of the data processing device of FIG. 1 for the implementing of the synchronization mechanism of FIG. 7.

According to a second embodiment shown in FIG. 7, the synchronization mechanism can be provided, not only by synchronization barriers realized using message down-counters, but by a serialization of the transmission of dynamic control messages of the throughput set points from each source to its links and from each link to its sources. The serialization can follow the paths defined by the transmission channels, but this is not an obligation. Different paths can be considered for the transmission of data packets and for the serialization of the synchronization mechanism.

Thanks to such a serialization, the number of messages transiting in the network on a chip for the dynamic control of the throughput set points is highly reduced and the links of the network are less solicited. Furthermore, the calculation for which details were provided in steps 110 and 120 hereinabove can be carried incrementally and in interlaced manner during the outbound and inbound travel of the serialization paths. Finally, each final addressee of these messages has the guarantee of receiving all of the expected messages.

The same simple example as previously, with two sources S1, S2 and four links L1, L2, L3, L4 shared between these two sources, is more precisely shown in FIG. 7. The synchronization mechanism which shall now be described for this simple example can obviously very easily be generalized to any routing configuration.

During the step 100 (i=0), the throughput set points of the sources S1 and S2 are initialized. The initialized value $\rho_{1,0}$ of the throughput set point of the source S1 must be sent to the links L1, L2 and L3. The initialized value $\rho_{2,0}$ of the throughput set point of the source S2 must be sent to the links L2, L3 and L4. In practice, the throughput set points can be initialized to 0. In this case, the margins $rc_{lnk,0}$ and $rd_{lnk,0}$ are initialized on each link at the following values:

$$\begin{cases} rc_{lnk,0} = C_{lnk} - \varepsilon \\ rd_{lnk,0} = BF_{lnk} - \varepsilon \end{cases} \quad (36)$$

During the step 100 also, each source transmits a triggering message of the iteration i=1 to the first link on its serialization path. In the example of FIG. 7, the serialization path for each source is its transmission channel as a concern for simplification. More precisely, the serialization path of the source S1 follows the link L1, then the link L2, then the link L3 for an outbound journey and the link L3, then the link L2, then the link L1 for a return journey. The serialization path of the source S2 follows the link L2, then the link L3, then the link L4 for an outbound journey and the link L4, then the link L3, then the link L2 for a return journey. The source S1 therefore transmits a triggering message of the iteration i=1 to the link L1 and the source S2 transmits a triggering message of the iteration i=1 to the link L2.

After receiving the triggering message of the iteration i=1 on the outbound journey of any one of the transmission channels, each link concerned executes incrementally and in an interlaced manner a first portion of the steps 110 and 120 defined hereinabove for this transmission channel. Once it has executed this first portion of the steps 110 and 120, it sends the triggering message of the iteration i=1 to the next link on the outbound journey, until the last link of the transmission channel. Each link executes this first portion of the steps 110 and 120 for each transmission channel to which it belongs, each time that it is solicited by a corresponding triggering message.

This execution consists in carrying out the following calculations at the iteration i=1:

$$\Delta c_{lnk,1} = \frac{rc_{lnk,0}}{NS_{lnk,0}} \quad (37)$$

$$\Delta d_{lnk,1} = \frac{rd_{lnk,0}}{\sum_{ch \in CCNS_{lnk,0}} D_{ch,lnk}} \quad (38)$$

$$\Delta_{lnk,1} = \mathrm{Min}(\Delta c_{lnk,1}, \Delta d_{lnk,1}) \quad (39)$$

$$\Delta \rho_{ch,lnk,1} = \mathrm{Min}(\Delta \rho_{ch,lnk-1,1}, \Delta_{lnk,1}) \quad (40)$$

Note the value $\Delta \rho_{ch,lnk,1}$ obtained by the calculations (37) to (40) is different for each transmission channel to which the considered link belongs. This value is transmitted to the next link lnk+1 in the outbound journey of the corresponding transmission channel with the corresponding triggering message.

Also note that the last value $\Delta \rho_{ch,L,1}$ obtained by the calculations (37) to (40) for the last link of a transmission channel is equal to the value of the minimum available margin $\Delta_{ch,1}$ thanks to the minimalization (40) calculated from one to the next in the links of the network.

Once the last link L of any one of the transmission channels has finished its execution of the first portion of the steps 110 and 120 such as defined hereinabove for the iteration i=1 and the value $\Delta_{ch,1}$ is known, it incrementally and in an interlaced manner executes a second portion of the steps 110 and 120 for the iteration i=1. Once it has executed this second portion of the steps 110 and 120, it transmits a message to continue the iteration i=1 to the next link on the inbound journey, until the first link of the transmission channel, with the execution of the second portion of the steps 110 and 120 as such from one to the next. Each link executes this second portion of the steps 110 and 120 for each transmission channel to which it belongs, each time that it is solicited by a corresponding message to continue.

This execution consists in carrying out the following calculations at the iteration i=1:

$$\begin{cases} rc_{lnk,1} = C_{lnk} - \varepsilon - \sum_{ch \in CC_{lnk}} \rho_{ch,1} \\ rd_{lnk,1} = BF_{lnk} - \varepsilon - \sum_{ch \in CC_{lnk}} D_{ch,lnk} \cdot \rho_{ch,1} \end{cases} \quad (41)$$

This reverts to calculating:

$$\begin{cases} rc_{lnk,1} = C_{lnk} - \varepsilon - \sum_{ch \in CC_{lnk}} \rho_{ch,0} - \sum_{ch \in CC_{lnk}} \Delta_{ch,1} \\ rd_{lnk,1} = BF_{lnk} - \varepsilon - \sum_{ch \in CCS_{lnk}} D_{ch,lnk} \cdot \rho_{ch,0} - \sum_{ch \in CC_{lnk}} D_{ch,lnk} \cdot \Delta_{ch,1} \end{cases} \quad (42)$$

Or more simply:

$$\begin{cases} rc_{lnk,1} = rc_{lnk,0} - \sum_{ch \in CC_{lnk}} \Delta_{ch,1} \\ rd_{lnk,1} = rd_{lnk,0} - \sum_{ch \in CC_{lnk}} D_{ch,lnk} \cdot \Delta_{ch,1} \end{cases} \quad (43)$$

Moreover, this execution comprises the updates of the number $NS_{lnk,1}$ and of the set $CCNS_{lnk,1}$ using the values $\Delta_{ch,1}$. Indeed, for each value $\Delta_{ch,1}$ zero (or in practice, less than $\varepsilon$), the number $NS_{lnk,1}$ can be decremented by one unit and the corresponding source can be deleted from the set $CCNS_{lnk,1}$. These updates can be carried out globally after receiving all of the continuation messages of the iteration i=1 for each one of the channels or iteratively at reception of each continuation message with validation to the last one received.

Once the first link of any one of the transmission channels has finished its execution of the second portion of the steps 110 and 120 such as defined hereinabove for the iteration i=1, it transmits a continuation message of the iteration i=1 to the corresponding source.

The iteration i=1 then ends by a finalizing of the step 120 by each source. This finalization consists in carrying out the calculation of the equation (18) for i=1 and for each source S1, S2.

The second iteration i=2 is not shown in the example of FIG. 4, but the method iterates as in the first embodiment until the condition of the end of iteration of the test step 125 is satisfied (i.e. no more non-saturated active source).

At any iteration i other than the first iteration, the first portion of the steps 110 and 120 can be executed by a link lnk of any one of the transmission channels on the outbound journey only when the following two conditions are fulfilled:

this link has received the triggering message of the iteration i as indicated hereinabove, this link has executed each second portion of the steps 110 and 120 of the iteration i−1.

Likewise, the second portion of the steps 110 and 120 can be executed by a link lnk of any one of the transmission channels on the inbound journey only when each first portion of the steps 110 and 120 of the iteration i has been executed on all of the transmission channels wherein it is located.

The use of a message down-counter on each link is therefore required both for the first portion of the steps 110 and 120 (outbound journey) and the second portion of the steps 110 and 120 (inbound journey).

On the other hand, thanks to the synchronization mechanism via serialization, the use of a message down-counter is not necessary on the sources in this second embodiment.

By generalization of the first iteration, the execution of the first portion of the steps 110 and 120 of any iteration i consists in performing the following calculations:

$$\Delta c_{lnk,i} = \frac{rc_{lnk,i-1}}{NS_{lnk,i-1}} \quad (44)$$

$$\Delta d_{lnk,i} = \frac{rd_{lnk,i-1}}{\sum_{ch \in CCNS_{lnk,i-1}} D_{ch,lnk}} \quad (45)$$

$$\Delta_{lnk,i} = \mathrm{Min}(\Delta c_{lnk,i}, \Delta d_{lnk,i}) \quad (46)$$

$$\Delta \rho_{ch,lnk,i} = \mathrm{Min}(\Delta \rho_{ch,lnk-1,i}, \Delta_{lnk,i}) \quad (47)$$

Note as for the first iteration that the last value $\Delta \rho_{ch,L,i}$ obtained by calculations (44) to (47) for the last link of a transmission channel is equal to the value of the minimum available margin $\Delta_{ch,i}$ thanks to the minimalization (47) calculated from one to the next in the links of the network.

By generalization of the first iteration too, the execution of the second portion of the steps 110 and 120 of any iteration i consists in performing the following calculations:

$$\begin{cases} rc_{lnk,i} = rc_{lnk,i-1} - \sum_{ch \in CCS_{lnk}} \Delta_{ch,i} \\ rd_{lnk,i} = rd_{lnk,i-1} - \sum_{ch \in CC_{lnk}} D_{ch,lnk} \cdot \Delta_{ch,i-1} \end{cases} \quad (48)$$

Moreover, this execution comprises the updates of the number $NS_{lnk,i}$ and of the set $CCNS_{lnk,i}$ using the values $\Delta_{ch,i}$.

Figure 8:
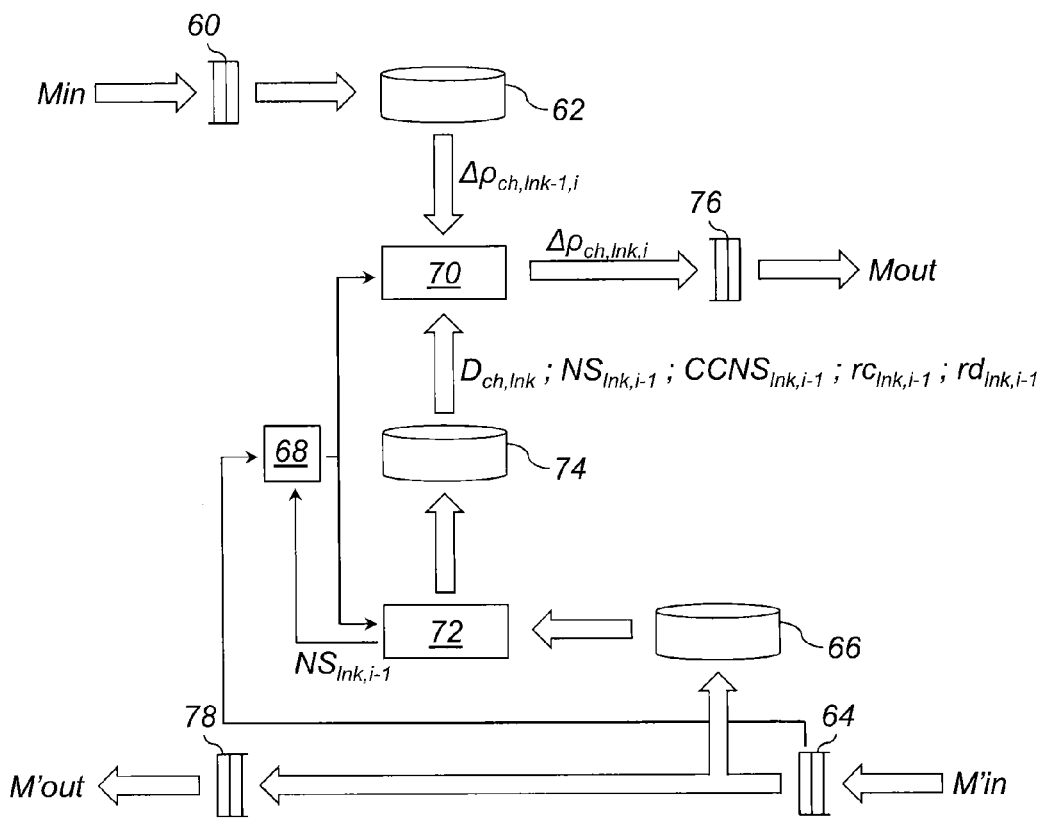

An example of architecture corresponding to the synchronization mechanism of FIG. 7 such as implemented in any one of the links lnk is shown in FIG. 8.

For the outbound journey, any incoming message Min is received by a buffer memory 60 then directed to an intermediate storage zone 62. For the inbound journey, any incoming message M'in is received by a buffer memory 64 then directed to an intermediate storage zone 66. This arrival of message M'in on the inbound journey triggers a decrementing of the local down-counter 68. When the local down-counter 68 reaches the zero value, two functional processing units 70 and 72 are informed of this. The processing unit 70 then recovers all of the messages Min stored in the intermediate storage zone 62 in order to execute the first portion of the steps 110 and 120 of the outbound journey of an iteration i, while the processing unit 72 recovers all of the messages M'in stored in the intermediate storage zone 66 in order to execute the second portion of the steps 110 and 120 of the inbound journey of the preceding iteration i−1.

The messages Min comprise the values $\Delta\rho_{ch,lnk-1,i}$ coming from the preceding links. The processing unit 70 also recovers in memory 74 the other values required to calculate the value $\Delta\rho_{ch,lnk,i}$ for each contributing source ch of the link lnk, namely: the coefficients $D_{ch,lnk}$, the values $rc_{lnk,i-1}$, $rd_{lnk,i-1}$ and the number of non-saturated active sources $NS_{lnk,i-1}$ to be updated as well as the set $CCNS_{lnk,i-1}$. It finally proceeds with the calculations (44) to (47) and supplies as output buffer memory 76 Mout messages containing the values $\Delta\rho_{ch,lnk,i}$ sent to all of the following links concerned.

The messages M'in comprise the values $\Delta_{ch,i-1}$ coming from the preceding links in the inbound journey of the iteration i−1 and intended to be sent to the corresponding sources. They are therefore also directly routed to an output buffer memory 78 as messages M'out. Using the values $\Delta_{ch,i-1}$ and by proceeding with the calculation (48), the processing unit 72 proceeds with updating the values $rc_{lnk,i-1}$, $rd_{lnk,i-1}$, $NS_{lnk,i-1}$ as well as the set $CCNS_{lnk,i-1}$. This furthermore provokes the re-initialization of the down-counter 68 to the value $NS_{lnk,i-1}$.

Figure 9:
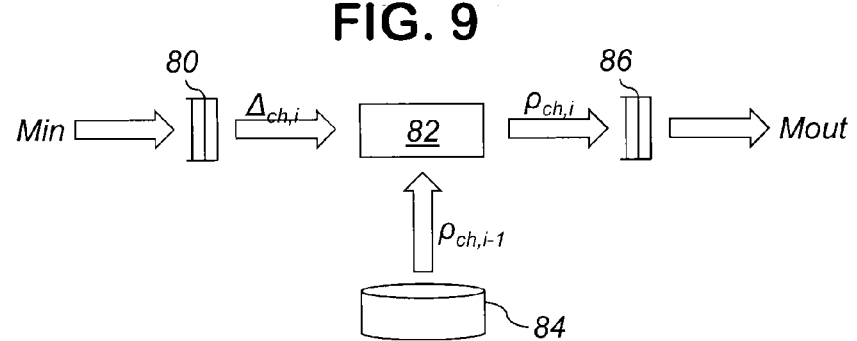

An example of architecture that corresponds to the synchronization mechanism of FIG. 7 such as implemented in any one of the sources ch is shown in FIG. 9.

Any incoming message Min is received by a buffer memory 80 then directed to a processing unit 82 that as such recovers the value of the additional throughput value to be applied $\Delta_{ch,i}$. It also recovers in memory 84 the last value of the throughput set point $\rho_{ch,i-1}$. It finally proceeds with the calculation (18) and supplies as output buffer memory 86 a message Mout comprising the updated value of the throughput set point $\rho_{ch,i}$. This calculation causes the application of the new throughput set point by the traffic limiter concerned.

The architectures such as shown diagrammatically in FIGS. 5, 6, 8 and 9 comprise calculating units 36, 48, 70, 72 and 82 which can be implemented via computer programming. These architectures functionally comprise as such several computer programs or several functions of the same computer program. Note indeed that the calculating units 36, 48, 70, 72 and 82 are presented as being separate, but this distinction is purely functional. They could just as well be grouped together according to all of the possible combinations into one or more pieces of software. Their functions could also be at least partially micro-programmed or micro-wired in dedicated integrated circuits in order to accelerate the processing. As such, alternatively, computer devices that implement the calculating units 36, 48, 70, 72 and 82 could be replaced with electronic devices comprised solely of digital circuits (without a computer program) for performing the same actions.

It clearly appears that a method for dynamically controlling the throughput set points such as that described hereinabove makes it possible to achieve a genuinely optimized balance between the various throughputs of the various transmission channels of a network on a chip for a given routing configuration.

Furthermore, the combination of a clever distribution of the calculations with a serialization of the messages dedicated to dynamic control, such as has been considered in the second embodiment described hereinabove, allows for an original management of the synchronization mechanism induced by such a dynamic control.

Note moreover that the invention is not limited to the embodiments described hereinabove. It shall appear indeed to those skilled in the art that various modifications can be made to the embodiments described hereinabove, in light of the information that has just been disclosed. In the following claims, the terms used must not be interpreted as restricting the claims to the embodiments disclosed in this description, but must be interpreted in order to include therein all of the equivalents that the claims aim to cover due to their formulation and of which can be provided for by those skilled in the art by applying their general knowledge in implementing the information that has just been disclosed.

The invention claimed is:

1. A method for dynamically controlling throughput set points of emitting sources of data packets to receiving targets of these data packets in a network on a chip comprising a plurality of nodes, within which the sources and the targets are found, and a plurality of links between these nodes for the transmission of data packets, comprising:
   calculating, for each link of the network on a chip solicited by the transmission of data packets, an available throughput margin including
   calculation of a first margin based on a maximum throughput capacity of the respective link;
   calculation of a second margin based on a maximum local absorption capacity, by a buffer memory, of possible sporadic overflows of the respective link; and
   determination of a value of the available throughput margin according to the first and second calculated margins; and
   calculating and applying, for each emitting source of at least one data packet, an update of a throughput set point of the respective emitting source according to the calculated available throughput margins.

2. The method for dynamically controlling throughput set points as claimed in claim 1, wherein, for a given routing configuration that includes a set of transmission channels of the data packets between the sources and the targets, the calculating the available throughput margins and the calculating and the applying of the updates of the throughput set points are executed solely for non-saturated transmission channels, which are transmission channels that still have all their links with available throughput margin, and repeated until all of the transmission channels are saturated.

3. The method for dynamically controlling throughput set points as claimed in claim 2, wherein:
the calculation of the first margin noted as "$rc_{lnk}$" for each link noted as "lnk", calculated based on the maximum throughput capacity of the respective link noted as "$C_{lnk}$", is carried out on the basis of the following equation:

$$rc_{lnk} = C_{lnk} - \varepsilon - \sum_{ch \in CC_{lnk}} \rho_{ch},$$

wherein $\varepsilon$ is a residual margin constant below which it is considered that the available throughput margin is zero for the respective link, $CC_{lnk}$ is all of the transmission channels noted as "ch" which include the link lnk and $\rho_{ch}$ designates the throughput set point of the transmission channel ch, and
the calculation of the second margin noted as "$rd_{lnk}$" for each link lnk, calculated based on the maximum local absorption capacity of the respective link noted as "$BF_{lnk}$", is carried out on the basis of the following equation:

$$rd_{lnk} = BF_{lnk} - \varepsilon - \sum_{ch \in CC_{lnk}} D_{ch,lnk} \cdot \rho_{ch},$$

wherein $D_{ch,lnk}$ designates a predetermined coefficient that is proper to each link of each transmission channel.

4. The method for dynamically controlling throughput set points as claimed in claim 3, wherein as the controlling of the throughput is carried out at the source via a sliding window according to an arbitration discipline of the "work conserving" type:
the maximum local absorption capacity of each link lnk is defined by the following equation:

$$BF_{lnk} = QSIZE - \frac{(N_{lnk} - 1)}{lnk} \cdot DMAX \cdot Tw,$$

wherein QSIZE is the size of the buffer memory associated with the link lnk, $N_{lnk}$ is the number of transmission channels passing through the link lnk, DMAX is an injection maximum instant throughput constant and Tw is the length of the sliding window, and
each coefficient $D_{ch,lnk}$ is defined by the following equation:

$$D_{ch,lnk} = \sum_{l \in RR_{ch,lnk}} d_{l,ch},$$

wherein $RR_{ch,lnk}$ is all of the links passed through upstream of the link lnk in the transmission channel ch, with "l" designating one of these links, and $d_{l,ch}$ is a coefficient defined by $d_{l,ch} = (nd-1) \cdot PSIZE$, wherein $nd_l$ is the number of contributing directions on the buffer memory associated with the link l and PSIZE is the maximum size of the data packets expressed in the same unit as QSIZE.

5. The method for dynamically controlling throughput set points as claimed in claim 1, wherein the calculating the available throughput margins and the calculating and applying the updates of the throughput set points are executed sequentially, with this sequence itself being executed iteratively.

6. The method for dynamically controlling throughput set points as claimed in claim 5, wherein the calculating the available throughput margins and the calculating and applying the updates of the throughput set points are executed sequentially using synchronization barriers implemented in the form of message down-counters for each link of the network on a chip solicited by the transmission of data packets and for each emitting source of at least one data packet.

7. The method for dynamically controlling throughput set points as claimed in claim 1, wherein the calculating the available throughput margins and the calculating and applying the updates of the throughput set points are executed incrementally and are interlaced by a serialization of dynamic control messages of the throughput set points according to predefined paths.

8. The method for dynamically controlling throughput set points as claimed in claim 1, wherein the value of the available throughput margin is determined for each link as a minimum between the first and second margins calculated for the respective link.

9. A non-transitory computer-readable storage medium storing a computer program that can be read by a computer and/or executed by a processor, comprising instructions for the execution of the method for dynamically controlling throughput set points as claimed in claim 1, when said program is executed on a computer.

10. A network on a chip data processing device, comprising:
a plurality of nodes, within which are found emitting sources of data packets and receiving targets of these data packets;
a plurality of links between these nodes for the transmission of data packets; and
calculators for the dynamic control of throughput set points of the sources, distributed between the nodes of the network on a chip and programmed to:
for each link of the network on a chip solicited by the transmission of data packets, calculate an available throughput margin by
calculating a first margin based on a maximum throughput capacity of the respective link,
calculating of a second margin based on a maximum local absorption capacity, by a buffer memory, of possible sporadic overflows of the respective link, and
determining a value of the available throughput margin according to the first and second calculated margins; and
for each emitting source of data packets, calculate an update of a throughput set point of the respective emitting source according to the calculated available throughput margins.

* * * * *